United States Patent [19]

Wu

[11] Patent Number: 5,724,165

[45] Date of Patent: Mar. 3, 1998

[54] FAULT-TOLERANT OPTICAL ROUTING SWITCH

[75] Inventor: Kuang-Yi Wu, Bouler, Colo.

[73] Assignee: Macro-Vision Communications, L.L.C., Boulder, Colo.

[21] Appl. No.: 685,150

[22] Filed: Jul. 23, 1996

[51] Int. Cl.⁶ .................................................. H04B 10/00
[52] U.S. Cl. ........................................ 359/117; 359/156
[58] Field of Search ............................ 359/110, 115, 359/117, 127, 128, 245, 246, 247, 251, 39, 156

[56] References Cited

U.S. PATENT DOCUMENTS

| | | | |
|---|---|---|---|
| 4,650,289 | 3/1987 | Kuwahara | 350/375 |
| 4,720,171 | 1/1988 | Baker | 350/331 |
| 4,989,941 | 2/1991 | Soref | 350/96.18 |
| 5,013,140 | 5/1991 | Healey et al. | 350/347 |
| 5,162,944 | 11/1992 | Yamamoto et al. | 359/247 |
| 5,165,104 | 11/1992 | Wevrka | 385/7 |
| 5,317,658 | 5/1994 | Bergland et al. | 385/16 |
| 5,363,228 | 11/1994 | De Jule et al. | 359/117 |
| 5,381,250 | 1/1995 | Meadows | 359/39 |
| 5,414,541 | 5/1995 | Patel et al. | 359/39 |

*Primary Examiner*—Rafael Bacares
*Attorney, Agent, or Firm*—Dorr, Carson, Sloan & Birney, P.C.

[57] ABSTRACT

An electromagnetically controlled optical switch having a plurality of optical inputs. An optical signal at each input is spatially decomposed into two coparallel, orthogonally polarized beams by a birefringent element. An array of field-controlled polarization rotators are positioned in the paths of the decomposed light beams so that the polarization of the emergent beam pairs are set to be at one of the orthogonal states (i.e., both beams are either vertical or horizontally polarized). A following birefringent element spatially routes the light beam pairs based upon their polarization. A second array of polarization rotators follows the second birefringent element and is set to be in the opposite state from the first array, such that the emergent beams are orthogonal to their input states before they entered the first polarization rotator. The beams are combined by a birefringent element to form a plurality of combined beams that are coupled to output ports.

18 Claims, 12 Drawing Sheets

FAULT-TOLERANT OPTICAL ROUTING SWITCH

BACKGROUND OF THE INVENTION

1. Field of the Invention

The present invention relates, in general, to optical signal switching, and, more particularly, to spatial routing of optical signals transmitted in optical communications networks and optical signal processing.

2. Statement of the Problem

Optical fibers are used to carry optical signals in a variety of applications. Due to their high data bandwidth, optical fibers are of increasing importance. To use fiber optic transmissions, however, it is necessary to switch and route the optical signals between fibers. To interface with conventional digital circuitry, this switching is desirably controlled by an electrical signal.

Optical signals in fiber optic interconnection networks can be multiplexed using time-division multiplexing (TDM), wavelength-division multiplexing (WDM) and space-division multiplexing (SDM), for example. SDM is considered to be one of the most important fiber optic routing schemes. Major applications of SDM photonic switches include fiber optic communications, optical gyroscopes, optical signal processing, and micro/millimeter wave signal distribution of phased-array radar systems. Each of these multiplexing schemes requires switching of the optical signals from a plurality of channels onto one or more multiplexed channels in a controlled fashion.

One method to provide this switching is to convert the optical signals to electronic signals and perform the switching using conventional electronic devices. As information data rates continue to grow, it is increasingly difficult for conventional electronic switching systems to handle the high bandwidth provided by optical fibers. In addition, the required conversion between optical and electrical signals restricts the data format and increases complexity and cost.

Alternatively, "all-optical" routing/switching technologies have been proposed that are characterized by high "data transparency" and an ability to transfer optical signals from one transmission channel to another while the signals remain in optical form. One all-optical technique uses polarizing filters in combination with polarization rotating elements to route signals. These systems generally suffer from poor crosstalk between signal channels due to inaccurate polarization rotation. Crosstalk means any undesired signal leakage from one channel into another channel. The degradation caused by crosstalk is especially severe when a wide operating wavelength or wide operating temperature range is required. To minimize crosstalk, prior all optical switches require extremely high quality material and components with tight tolerances. These materials and components increase the overall cost of the switch significantly. What is needed is a robust switch that can be implemented with available low cost technology while providing high performance.

A wide variety of electromagnetic field-controlled optical switches are commercially available. They are based upon mechanical, electro-optic, thermo-optic, acousto-optic, magneto-optic, and semiconductor technologies. Mechanical switches, the most widely used routing components, have excellent low insertion loss and low crosstalk characteristics, but the switching time is limited to the millisecond range. LiNbO$_3$ integrated optic switches, on the other hand, offer nanosecond switching time, but have high insertion loss (5 dB), high crosstalk (20 dB) and polarization dependence. Hence, a need remains for a field-controlled optical switch with low channel crosstalk, reduced polarization dependence, and relatively fast reconfiguration (i.e., switching) speed.

3. Solution to the Problem

These and other problems of the prior art are solved by an optical routing switch that provides polarization-independent and low-crosstalk switching between a plurality of optical input/output (I/O) ports. Because the optical signals are retained as optical signals during the switching, system complexity and cost are reduced while preserving optical properties in the signals. Even when implemented with low cost components to decompose and recombine the optical signals, a robust design provides minimal crosstalk and polarization purity is maintained through the switch. This design also maintains its high performance (i.e., low-crosstalk, low polarization dependency) through wide operating temperatures and wavelengths, marking it as an ideal device in SDM applications.

SUMMARY OF THE INVENTION

Briefly stated, the present invention involves an electromagnetically controlled optical switch having a plurality of optical inputs. An optical signal at each input is spatially decomposed into two coparallel, orthogonally polarized beams by a birefringent element. An array of field-controlled polarization rotators are positioned in the paths of the decomposed light beams so that the polarization of the emergent beam pairs are set to be at one of the orthogonal states (i.e., both beams are either vertical or horizontally polarized). A following birefringent element spatially routes the light beam pairs based upon their polarization. A second array of polarization rotators follows the second birefringent element and is set to be in the opposite state from the first array, such that the emergent beams are orthogonal to their input states before they entered the first polarization rotator. The beams are combined by a third birefringent element to form a plurality of combined beams that are coupled to output ports.

Alternatively, the present invention can be arranged as a reflection type switch using a retroreflector such as a right angle prism to fold the optical beams back to the input ports to provide fewer components and lower cost and size.

DETAILED DESCRIPTION OF THE DRAWING

1. Overview

The present invention uses a series of optical elements placed between input and output ports to define a light path that can be altered to couple a selected output to a selected input. To ease illustration and understanding, the present invention is described in terms of simple switches such as single-pole-double-throw (SPDT) (i.e., single input to one of two outputs) and double-pole-double-throw (DPDT) (i.e., selectably routing two input ports to two output ports). However, it should be understood that many of the basic structures described herein can be coupled in parallel and/or in series to provide any number and type of desired switching. The low loss and high speed switching characteristics of the present invention in combination with inherent hardware simplicity lends itself to more complex structures created through parallel and serial combinations of the basic elements.

The switches in accordance with the present invention combine birefringent elements that provide polarization dependent beam steering with polarization converters or rotators to created a desired optical coupling. The polarization converters comprise one or more types of known elements including twisted nematic liquid crystal rotators, ferroelectric liquid crystal rotators, pi-cell based liquid crystal rotators, magneto-optic based Faraday rotators, and electro-optic based polarization rotators. The switching speed of these elements ranges from a few milliseconds to nanoseconds, therefore can be applied to a wide variety of systems to meet the needs of a particular application. These and similar basic elements are considered equivalents and may be substituted and interchanged without departing from the spirit of the present invention.

One feature of the switch in accordance with the present invention is that every optical signal is decomposed into two orthogonal polarization components that are switched using polarization rotators. The present invention employs a complementary design in which each component passes through two polarization rotators that are at opposite operating states, namely, one of the rotators applies a 90-degree polarization rotation to the optical signal while the other rotator applies no polarization rotation to the light signal. In this manner, the interchannel crosstalk of the optical switch is proportional to the product of the extinction ratio of each of the operating states of polarization rotators. The extinction ratio is defined as the ratio of the optical energy at the desired output polarization state to that at the opposite polarization state. Each polarization rotator will have two extinction ratios corresponding to its two operation states (ON and OFF). Hence, even where a rotator has a low extinction ratio in one operating mode, a low interchannel crosstalk can still be achieved for the switch, provided that the extinction ratio of the opposite mode is maintained high.

A principle advantage in accordance with the present invention is a relatively low cost switch using any available technology to implement the optical components described herein. While high-performance high-cost components may be used, exceptional performance is achieved using lower cost components. The robust design and arrangement of the optical elements results in cancellation of much of the crosstalk introduced by improper polarization rotation or low extinction ratio of any particular element. It is contemplated that other technologies for implementing the polarization rotators and birefringent elements (discussed below) will become available and that these will be useful in the implementation of the present invention.

2. SPDT switch

Figure 1A:
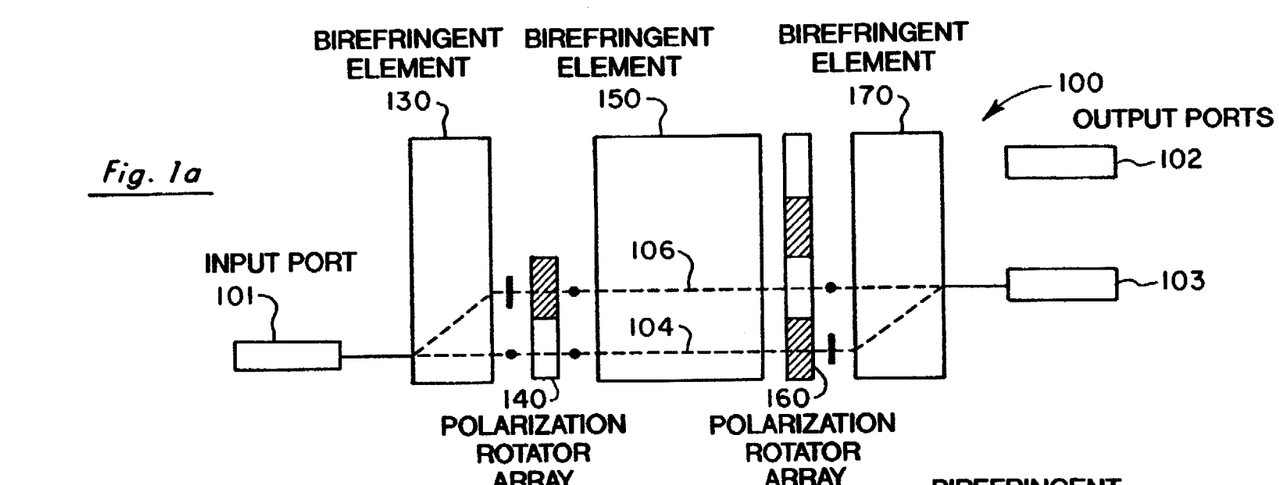
FIG. 1 is a plan view of a two-dimensional single-pole-double-throw (SPDT) optical switch in accordance with the present invention.
Figure 1B:
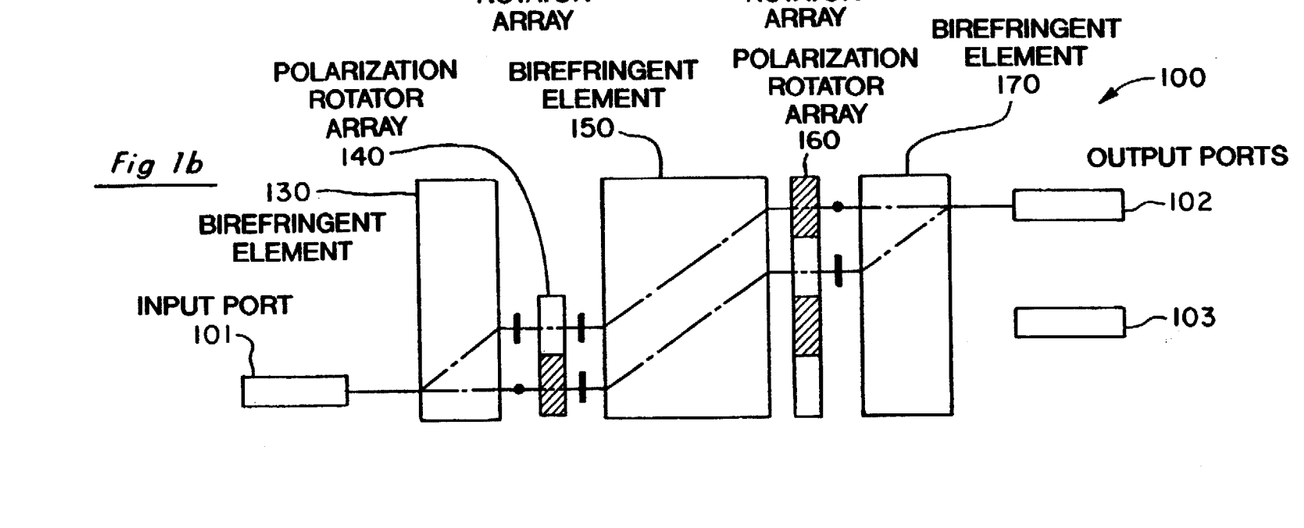

FIG. 1a and FIG. 1b show plan views of a two-dimensional single-pole-double-throw (SPDT or 1×2) optical switch 100 in accordance with the present invention where the light paths stay in the same plane of operation. Switch 100 comprises optical input output port 101 that receives an optical signal from, for example, an optical fiber (not shown). The optical signal is controllably routed to one of optical outputs 102 and 103 that serve to launch the switched signal into other optical fibers (not shown).

In FIG. 1a and FIG. 1b the vertical polarization is indicated by a heavy dot formed between optical elements (e.g., elements 130 and 140) while horizontal polarization is indicated by a heavy bar between optical elements. It should be understood that the heavy dot and heavy bar are not physical components of the present invention and are provided to enhance understanding.

An optical signal enters switch 100 through input port 101 and is split into two orthogonal polarizations by birefringent element 130. The optic axis of birefringent element 130 is oriented obliquely to the light beam propagation such that the optical signal is decomposed into a pair of orthogonally polarized coparallel-propagated beams upon exiting birefringent element 130. Facets of the birefringent crystals used to form birefringent element 130 can be, but are not required to be, normal to the propagation direction of the light beams. Birefringent element 130 comprises a material that allows the vertically polarized portion of the optical signal to pass through without changing course because they are ordinary waves in element 130. In contrast, horizontally polarized waves are redirected at an angle because of the birefringent walk-off effect. The angle of redirection is a well-known function of the particular materials chosen.

Polarization converter 140 is divided into two sub-elements such as upper and lower halves shown in FIG. 1a and FIG. 1b. These two sub-elements are configured such that one is on (indicated by cross-hatching) and one is off. This arrangement causes both beams to become either vertically polarized (shown in FIG. 1a) or horizontally polarized (shown in FIG. 1b) at the exit of polarization converter 140.

Birefringent element 150 comprises a similar material to birefringent element 130 in the particular example of FIG. 1a and FIG. 1b. Because both beams entering birefringent element 150 have identical polarization, both either pass through undisturbed (shown in FIG. 1a) or both are redirected (as shown in FIG. 1b). The physical size of element 150 determines the amount of redirection that occurs.

The two beams exiting birefringent element 150 enter polarization rotator array 160. Polarization rotator array 160 comprises four elements similar to the rotator array 140 discussed above. Four elements are provided to accommodate the four possible light paths exiting birefringent element 150 seen by comparing FIG. 1a and FIG. 1b. Rotator array 160 is activated such that the on/off states are opposite or complementary of the on/off states of rotator array 140. This complementary arrangement causes each of the optical signal portions leaving rotator array 160 to have a polarization opposite that which existed prior to entering rotator 140.

Birefringent element 170 comprises a material and construction similar to elements 130 and 150 discussed before. Element 170 serves to recombine the two optical signal portions into a single signal that is aligned either with output port 103 (FIG. 1a) or output port 102 (FIG. 1b).

Because each of elements 130, 140, 150, 160, and 170 are bi-directional devices, switch 100 performs identically in both directions. In other words, ports 102 and 103 could be employed as inputs to propagate signals into port 101, where switch 100 serves to select which signal is coupled to port 101 at any given time.

Figure 2A:
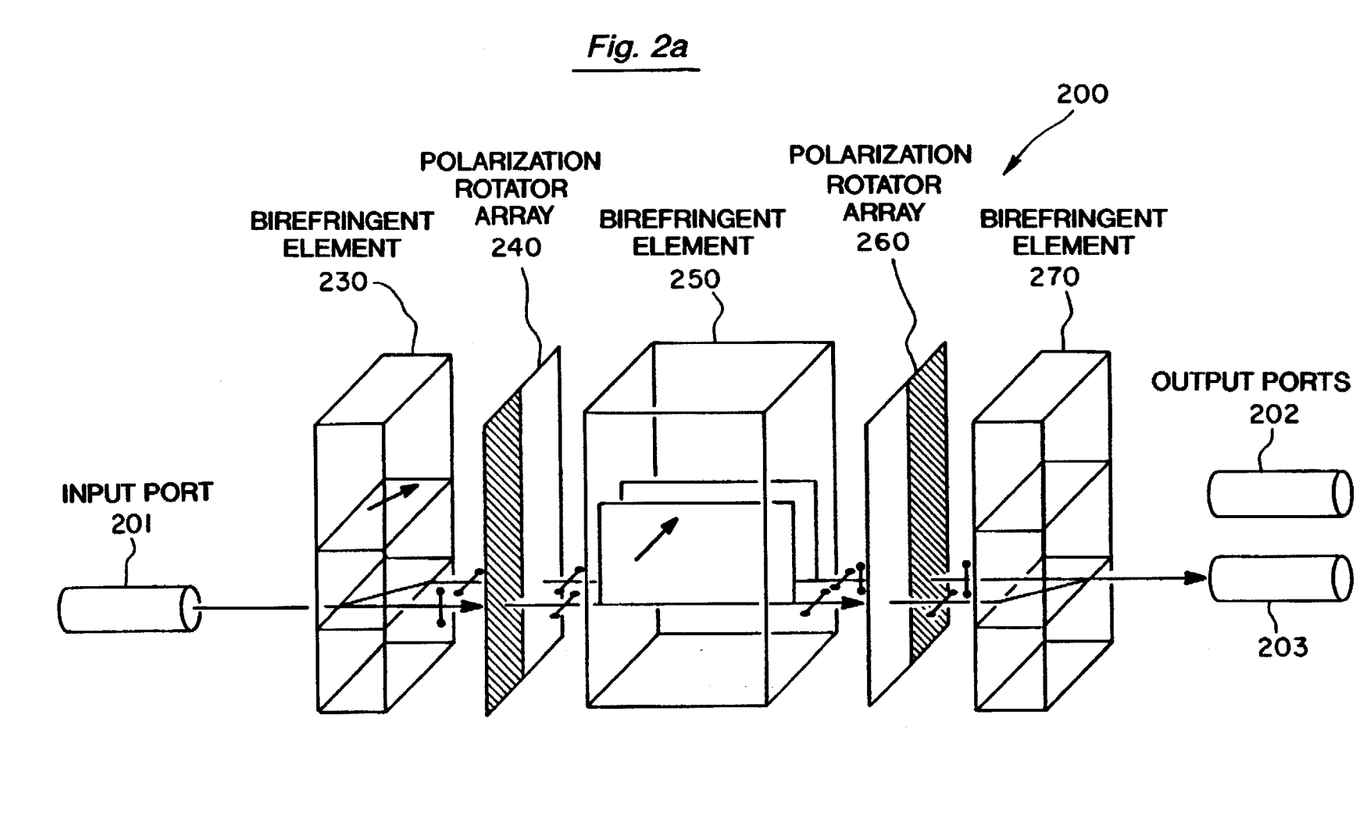
FIG. 2 illustrates a three-dimensional SPDT switch in accordance with the present invention.
Figure 2B:
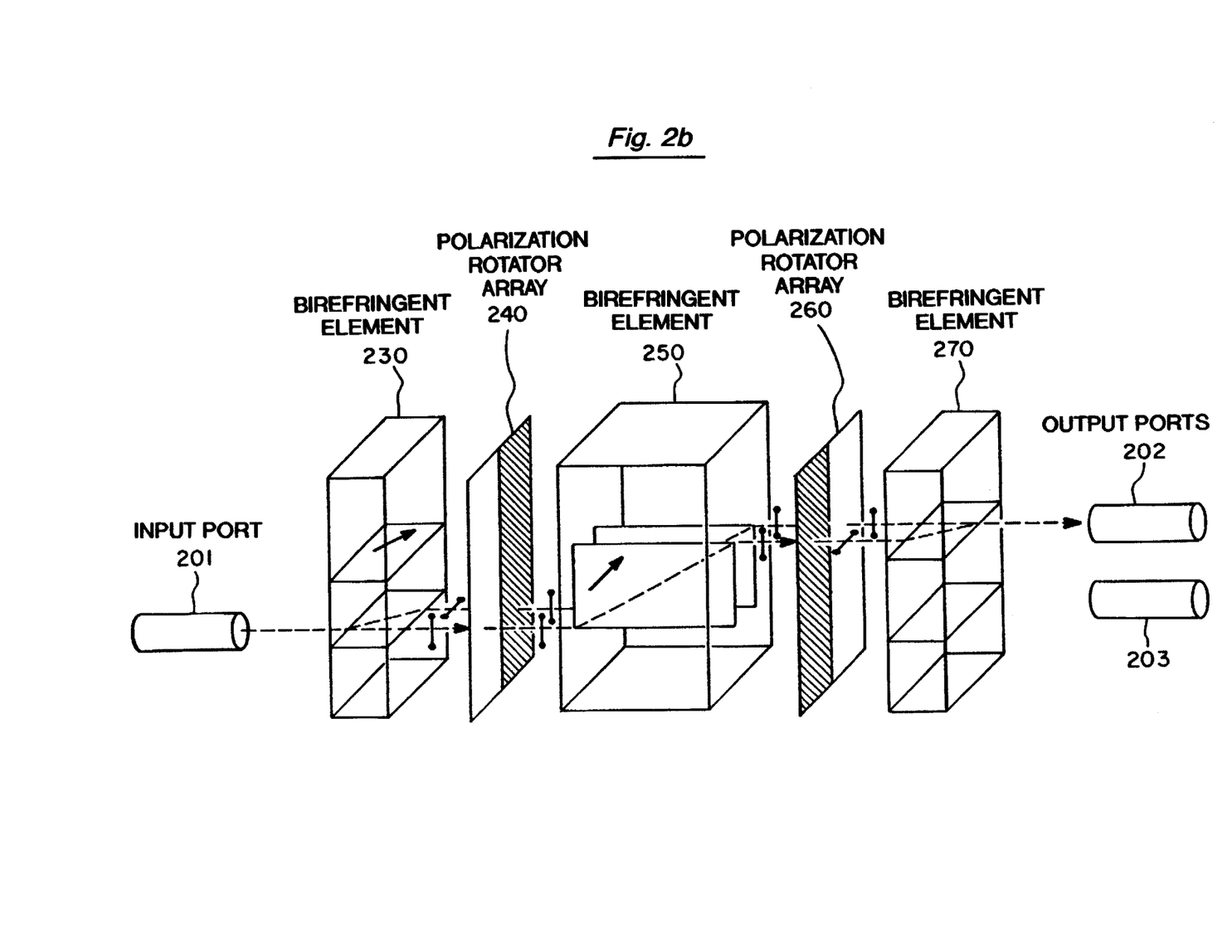

FIG. 2a and FIG. 2b show an alternative structure for a 1×2 switch 200 where the light paths are arranged in three dimensions rather than the two-dimensional implementation of FIG. 1a and FIG. 1b. Birefringent element 250 is oriented to 90 degrees such that its polarization eigen plane is perpendicular to that of birefringent element 230 and 270. Also, polarization rotators 240 and 260 are similar, each with two polarization sub elements.

An optical signal enters switch 200 through input port 201 and is split into two orthogonal polarizations (indicated by a vertical bar and a horizontal bar in FIG. 2a and FIG. 2b) by birefringent element 230. Polarization converter 240 is divided into two sub-elements as shown in FIG. 2a and FIG. 2b. These two sub-elements are configured such that one is on (indicated by cross-hatching) and one is off. This arrangement causes both beams to become either vertically polarized (shown in FIG. 2a) or horizontally polarized (shown in FIG. 2b) at the exit of polarization converter 240.

Birefringent element 250 comprises a similar material to birefringent elements 130, 150, and 170 in the particular example of FIG. 1a and FIG. 1b except for the orientation difference noted above. Because both beams entering birefringent element 250 have identical polarization, both either pass through undisturbed (shown in FIG. 2a) or both are redirected (as shown in FIG. 2b). The physical size of element 250 determines the amount of redirection that occurs.

The two beams exiting birefringent element 250 enter polarization rotator array 260. Polarization rotator array 260 comprises two elements and is substantially identical to the rotator array 240 discussed above. Only two elements are required due to the three-dimensional operation of switch 200. Rotator array 260 is activated such that the on/off states are opposite or complementary of the on/off states of rotator array 240. This complementary arrangement causes each of the optical signal portions leaving rotator array 260 to have a polarization opposite that which existed prior to entering rotator 240.

Birefringent element 270 comprises a material and construction similar to the other birefringent elements hereinbefore. Element 270 serves to recombine the, two optical signal portions into a single signal that is aligned either with output port 203 (FIG. 1a) or output port 202 (FIG. 1b).

3. DPDT Switch

Figure 3A:
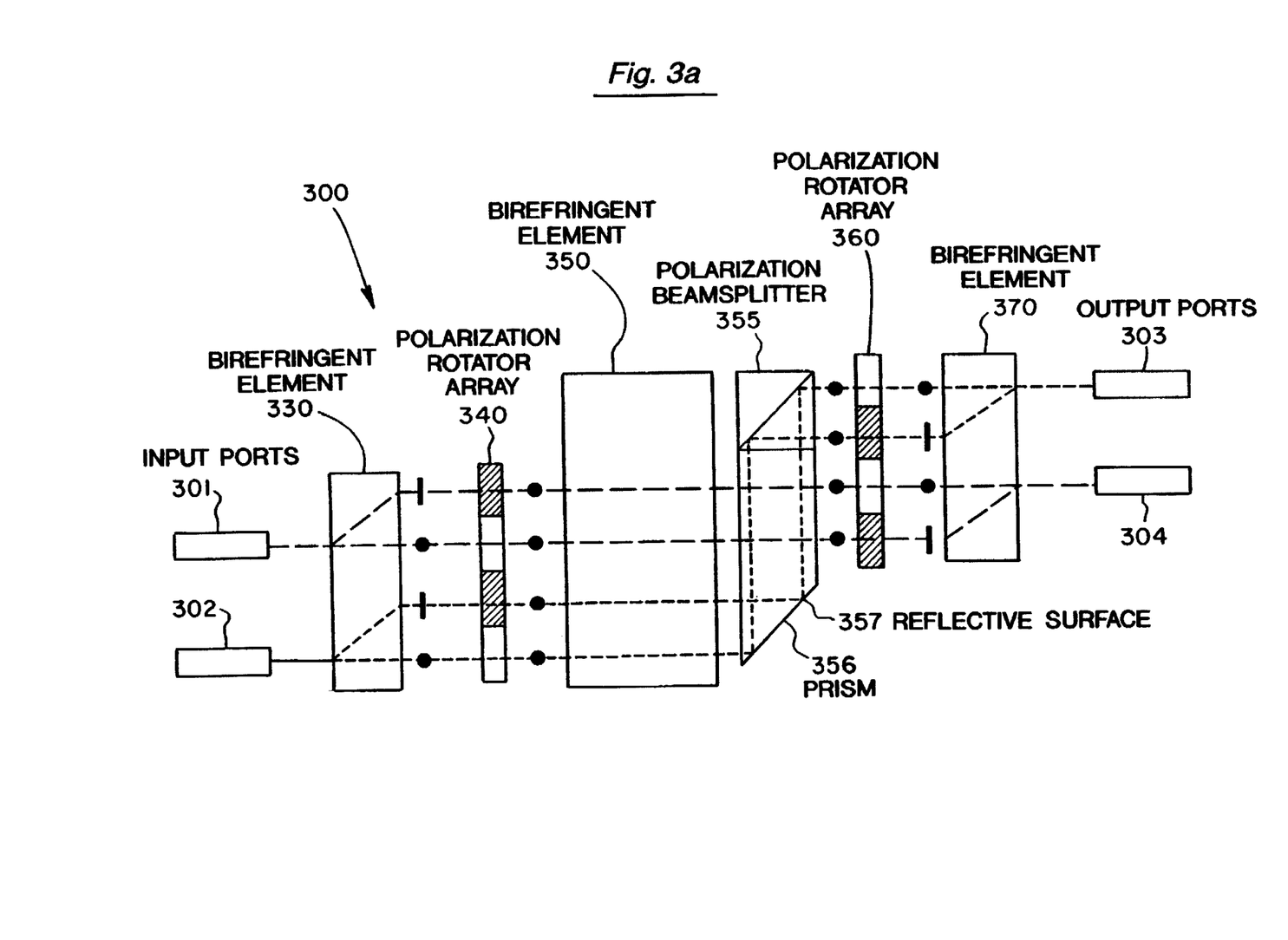
FIG. 3 shows in plan view a double-pole-double-throw (DPDT) optical switch in accordance with the present invention.
Figure 3B:
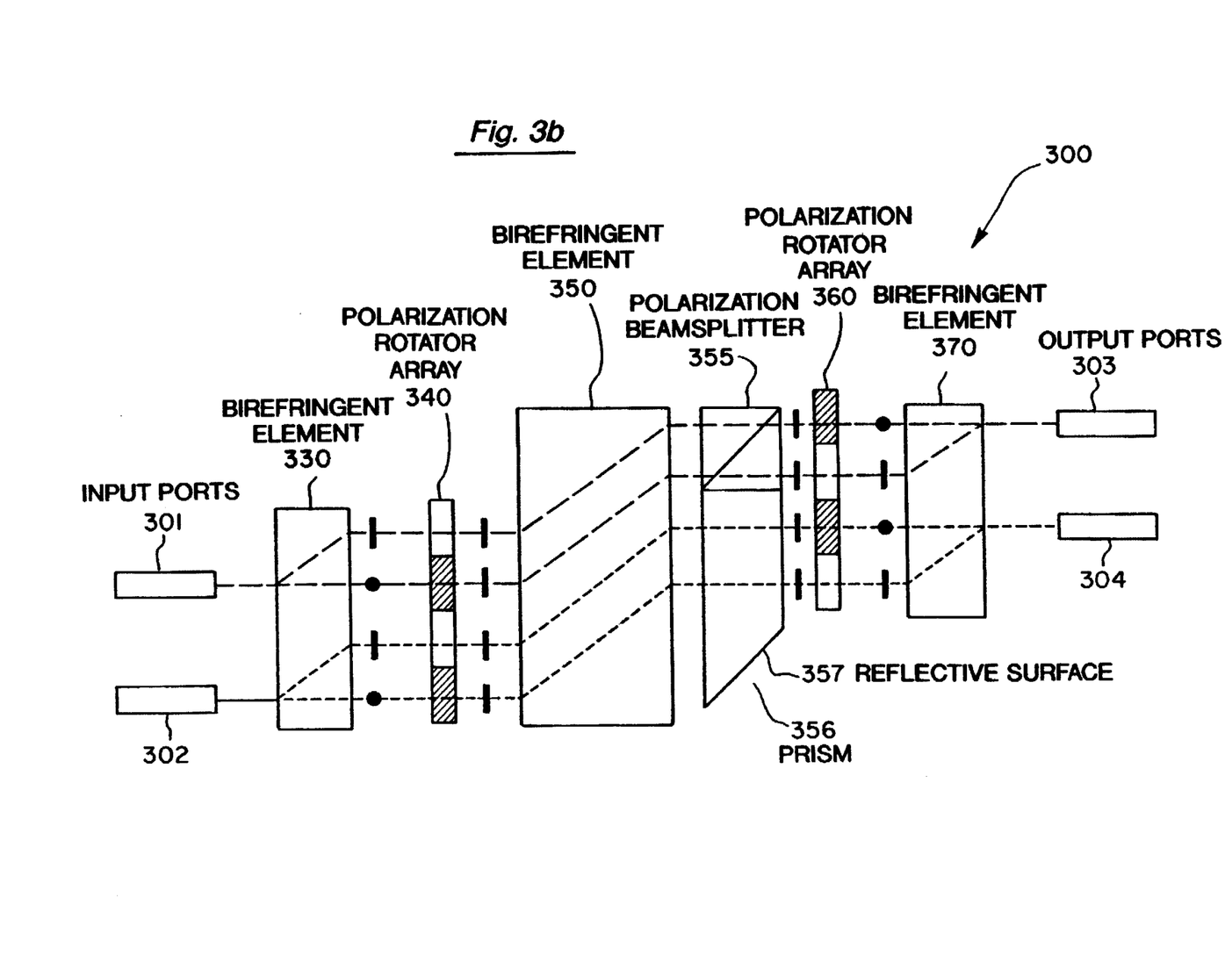

FIG. 3a and FIG. 3b show in plan view a double-pole-double-throw (DPDT or 2×2) optical switch 300 in accordance with the present invention. DPDT switch 300 of FIG. 3a and FIG. 3b is an extension of the SPDT switch 100 shown in FIG. 1. Elements of switch 300 bearing like numbers in the last two digits of the identification are similar in construction and function to the elements earlier described of switch 100.

A polarization beam splitter 355 and and a right angle prism 356 are added between birefringent element 350 and polarization rotator 360. Also, each of polarization rotator elements 340 and 360 include four sub-elements to modulate the light from four light beams in switch 300. The longer dashed lines indicates light beams resulting from an optical signal from input 301 while the shorter dashed lines indicate light beams from input 302. The heavy bars and heavy dots intersecting the light beam indicate horizontal polarization and vertical polarization, respectively.

Birefringent element 330 decomposes each of the two optical signals from inputs 301 and 302 into two orthogonally polarized spatially distributed light beams. FIG. 3a illustrates switch 300 configured to couple inputs 301 to output port 304 and input port 302 to output port 303. In the configuration of FIG. 3a, rotator 340 is set such that each of the four light beams has vertical polarization upon entering birefringent element 350. These vertically polarized light beams are considered ordinary waves in birefringent element 350 and propagate straight through element 350.

In combination, polarizing beam splitter 355 and right angle prism 356 displace the light beams originating from port 302 into the level of port 303. Right angle prism 356 has an angled reflective surface 357 aligned with the lower two light beams shown in FIG. 3a. The lower two light beams reflect at ninety degrees in the preferred embodiment from the angles surface and then are reflected a second time by polarizing beam splitter 355 into the level of output port 303. In contrast, beams originating from input port 301 pass through element 355 without modification or reflection. Upon exiting elements 355 and 356, each of the four light beams retains the vertical polarization as indicated in FIG. 3a.

Four-element rotator 360 is configured to have an opposite state from rotator 340. The output of rotator 360 includes the four optical signal portions with orthogonal polarization to that existing at the entrance to rotator element 340. Birefringent element 370 combines the upper pair of optical signal portions into a single signal coupled to output port 303. The lower pair of optical signal portions are combined into a single signal coupled to output port 304.

FIG. 3b illustrates switch 300 configured to couple inputs 301 to output port 303 and input port 302 to output port 304. In the configuration of FIG. 3b, rotator 340 is set such that each of the four light beams has horizontal polarization upon entering birefringent element 350. These horizontally polarized light beams are considered extraordinary waves in birefringent element 350 and are displaced as they travel through element 350 by an amount determined by the thickness of birefringent element 350. The amount of spatial displacement is chosen to positing the light beams at the same level as output ports 303 and 304. As the four displaced signal portions pass through rotator 360 (having a complementary configuration to rotator 340) the polarization becomes orthogonal to the state entering rotator 340 such that they are combined into output ports 303 and 304. DPDT switch 300 shown in FIG. 3a and FIG. 3b retains a crossed-double-pass structure so that low crosstalk and wide operation tolerance is achieved.

4. Folding reflex structure

The prior embodiments are transmission type switches in that the signals are routed primarily through transmission properties of the elements through which the light beams pass. Another embodiment in accordance with the present invention is shown by switch 400 in FIG. 4a and FIG. 4b. Switch 400 uses a "folded" routing structure that can be implemented in smaller dimensions with fewer optical elements to enable the switching function.

Figure 4A:
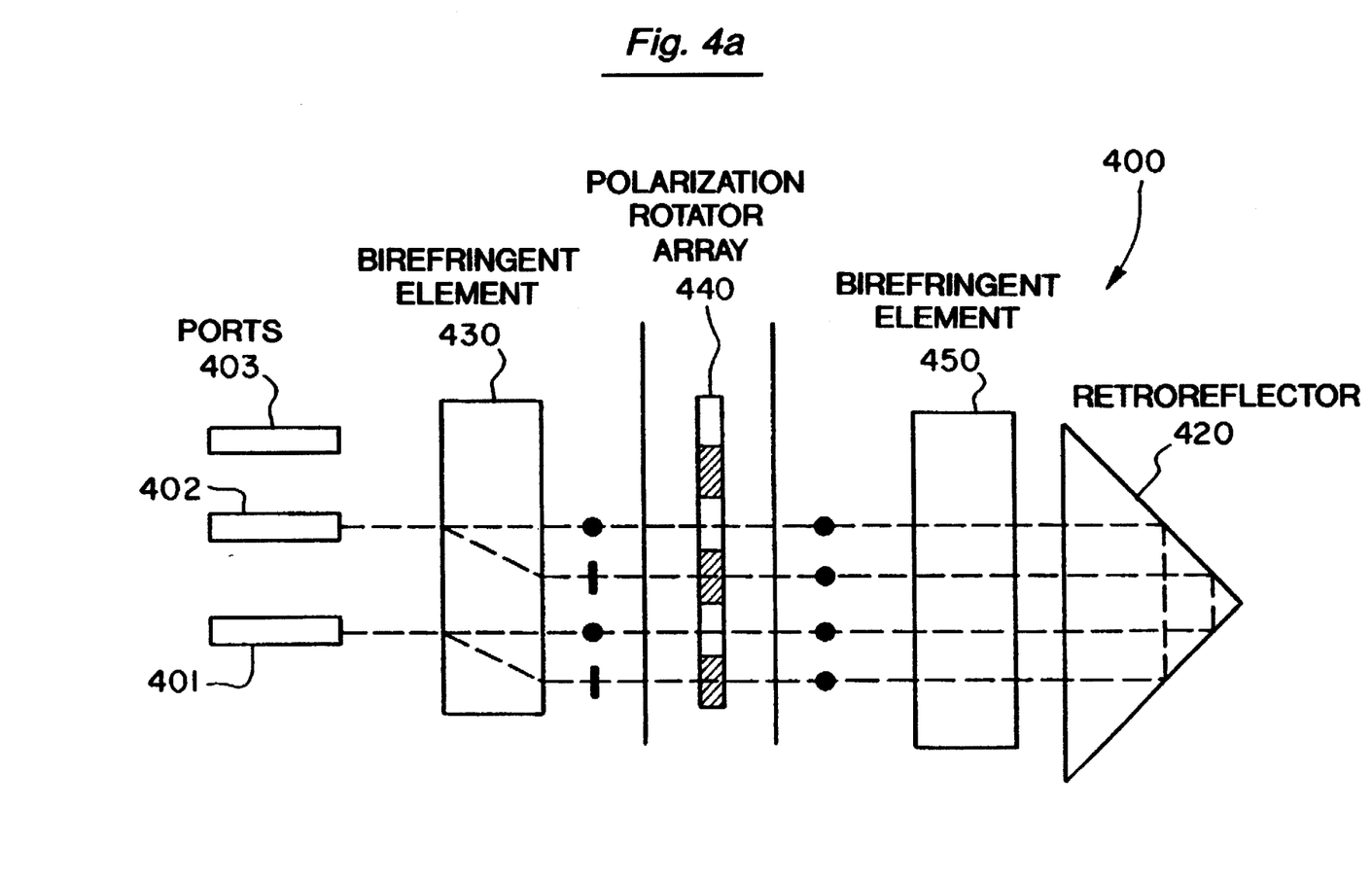
FIG. 4 shows in plan view two routing states of a two-dimensionally folded implementation of a SPDT optical switch.
Figure 4B:
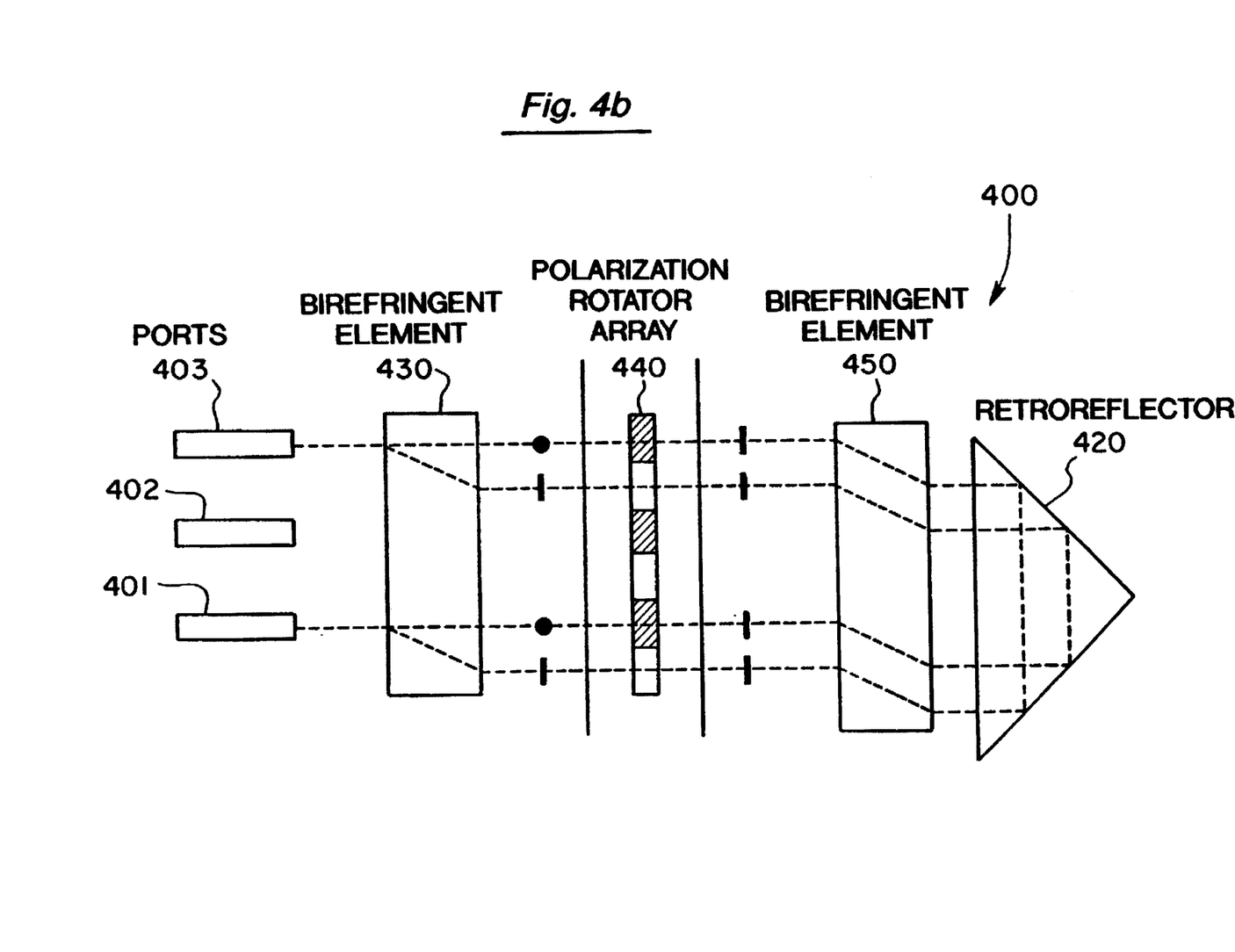

FIG. 4a and FIG. 4b show a plan view of a folded two-dimensional SPDT switch 400 in accordance with the present invention. A key component of switch 400 is a retroreflector such as right angle reflecting prism 420 that eliminates the need for one birefringent element and one rotator as compared to the transmission switch 100. Polarization rotator 440 comprises six elements to modulate the polarization state of the optical signal portions. Hence, switch 400 has the same number of rotator sub elements as switch 100, but has the advantage of compactness. Moreover, when a spatial light modulator such as a liquid crystal type polarization rotator is used for rotator element 440, rotator element 440 can be realized by simple photolithographic processes that significantly reduce the cost of switch 440.

The sub-elements of rotator 440 are configured such that adjacent sub-elements have complementary states. On the right hand side of rotator element 440 the polarization states are either all vertical (FIG. 4a) or all horizontal (FIG. 4b). Depending on which polarization is selected, the light paths are either undisturbed (FIG. 4a) or are all modified (FIG. 4b) in birefringent element 450. The light beams exit birefringent element 450 and are reflected by right angle prism reflector 420 back into birefringent element 450 at a location determined by the geometry of prism reflector 420. After passing through birefringent element 450 a second time, the light beams are directed into rotator 440 again where the output polarizations become orthogonal to their original states before entering rotator 440 the first time. The light beams are then recombined by birefringent element 430 and exit to a selected one of ports 401–403.

In FIG. 4a a coupling is made between ports 401 and 402, while in FIG. 4b a coupling is made between ports 401 and 403. It should be understood that these couplings are bi-directional, so either port may be considered input and the other output. The arrangement of switch 400 assures low crosstalk because it depends on the product of the on/off extinction ratio of the polarization rotators which one of the state is quite high.

The folding concept shown in switch 400 can be applied to a three-dimensional SPDT switch 500 shown in FIG. 5. Here, two birefringent elements 530 and 550 have been arranged with their polarization eigen planes perpendicular to each other. The folding is accomplished by retroreflector 525 that interchanges the optical signal portions during the return path. The number of sub-elements in polarization rotator 440 is reduced to two, as compared to six in switch 400 shown in FIG. 4a and FIG. 4b.

Figure 5A:
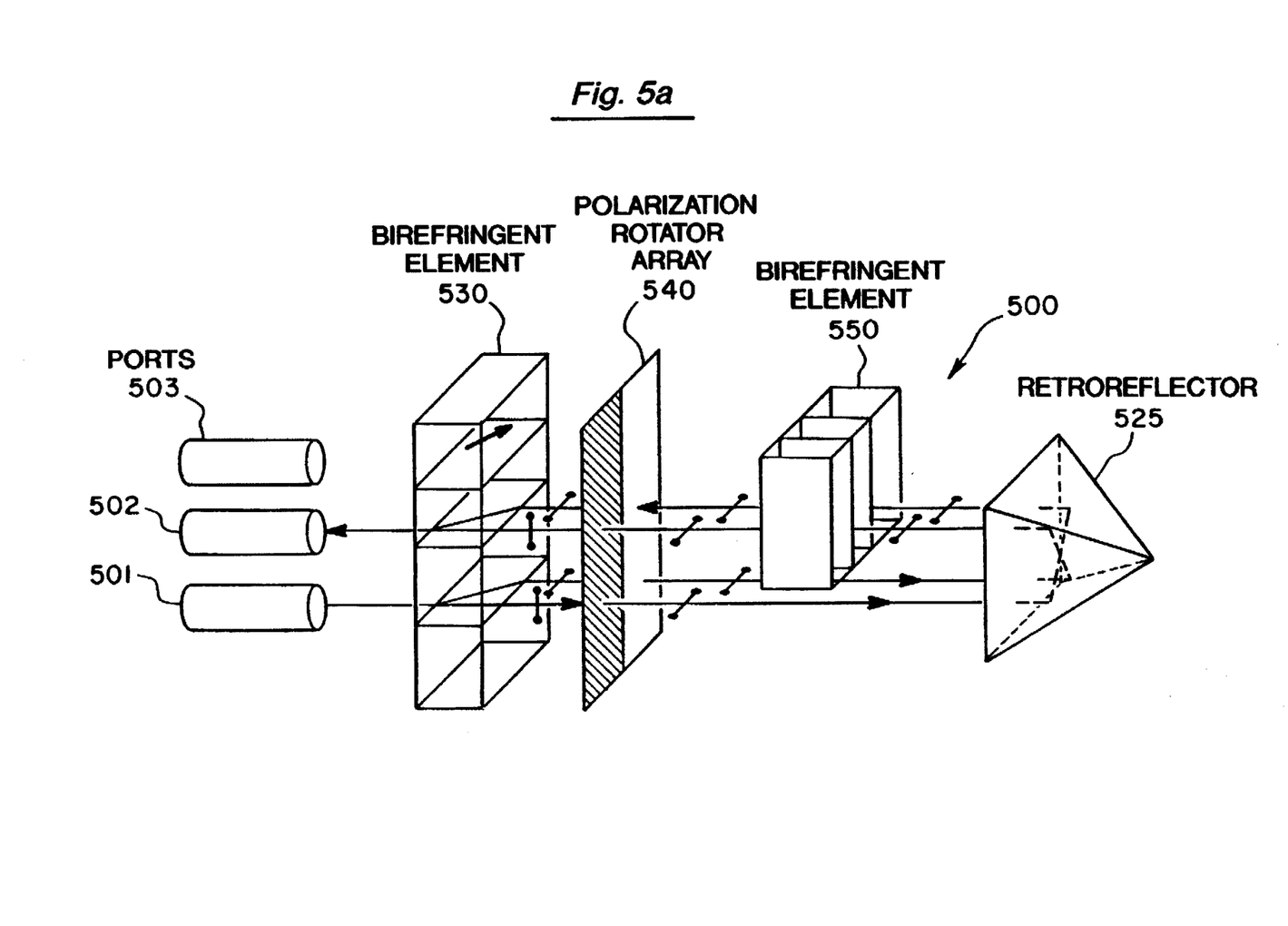
FIG. 5 depicts a three-dimensional view of two routing states of a three-dimensionally folded implementation of a SPDT optical switch.

In FIG. 5a, horizontal polarizations result after the light waves exit rotator 540. The light beams go beneath birefringent element 550 and are reflected back by retroreflector 525 with light paths interchanged. These two horizontal polarizations are considered ordinary waves in birefringent element 550 and pass through without spatial deviation. The two light beams then pass through the rotator 540 for a second time with output polarizations orthogonal to their original states. They are recombined by birefringent element 530 and exit at port 502.

Figure 5B:
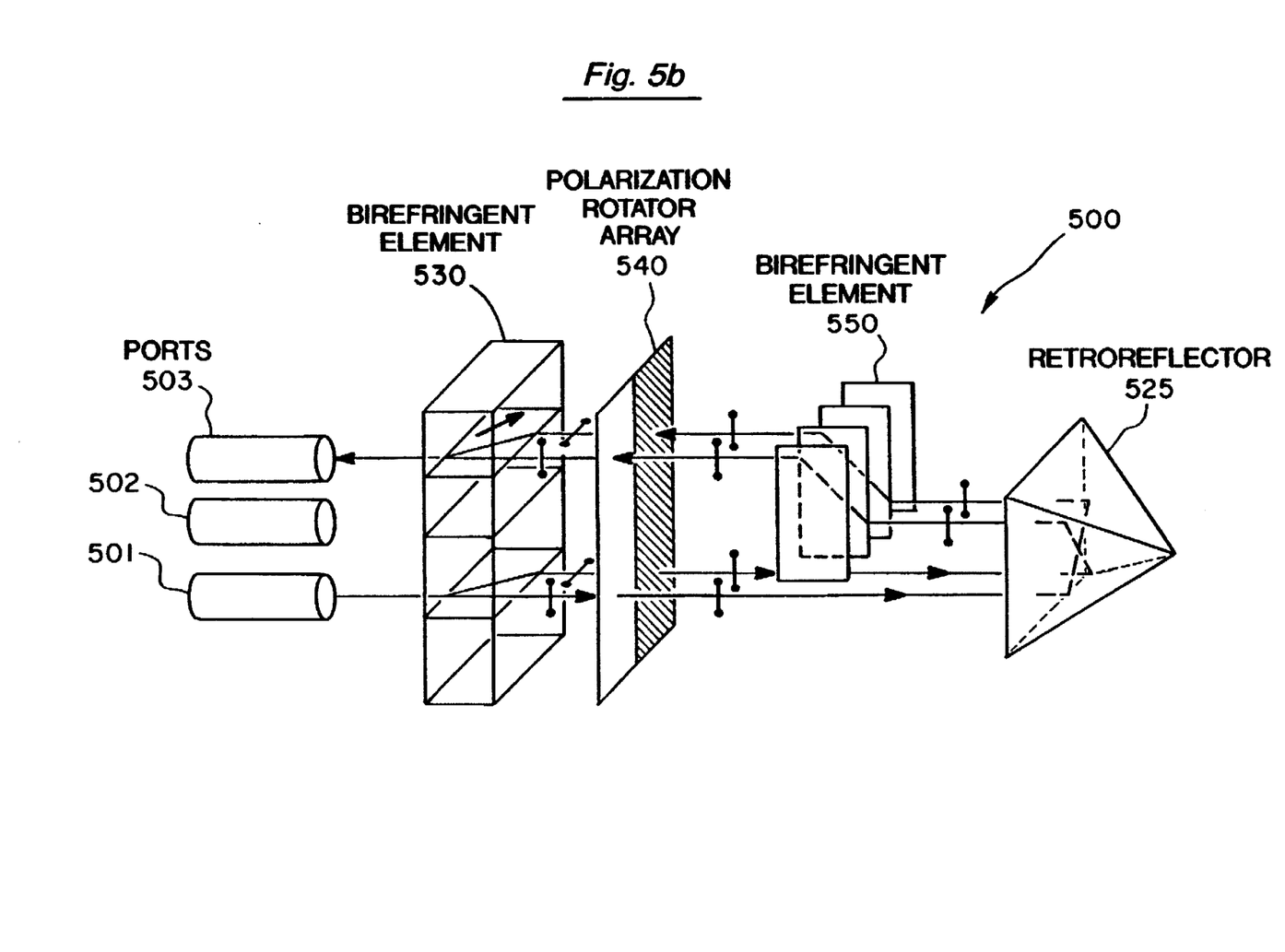

In FIG. 5b, the output polarization of the light beams after a first pass through rotator 540 are vertical. When reflected by from retroreflector 525 the light beams are considered extraordinary waves in birefringent element 550 and are deviated as shown in FIG. 5b. After passing through rotator 540 a second time, the polarizations become orthogonal to their original states. The light beams are recombined by birefringent element 530 and exit a port 503.

An alternative embodiment of a three-dimensional folded SPDT switch extends birefringent element 550 to cover both the forward and backward propagating paths. In this case, horizontal polarizations shown in FIG. 5a follow the same paths as they would not be altered by passing through the extended portion of element 550. However, vertical polarizations shown in FIG. 5b are redirected downward in the forward propagating path rather than passing below birefringent element 550 as shown in FIG. 5b. The backward propagating paths after the folding by retroreflector 525 are the same as shown in FIG. 5b. The extended birefringent element provides greater spatial displacement of the two light waves therefore allowing greater distance between output ports 502 and 503. This may be advantageous in the final device packaging because it relaxes the tight dimensions between the two ports.

5. Folded DPDT Switch

Figure 6A:
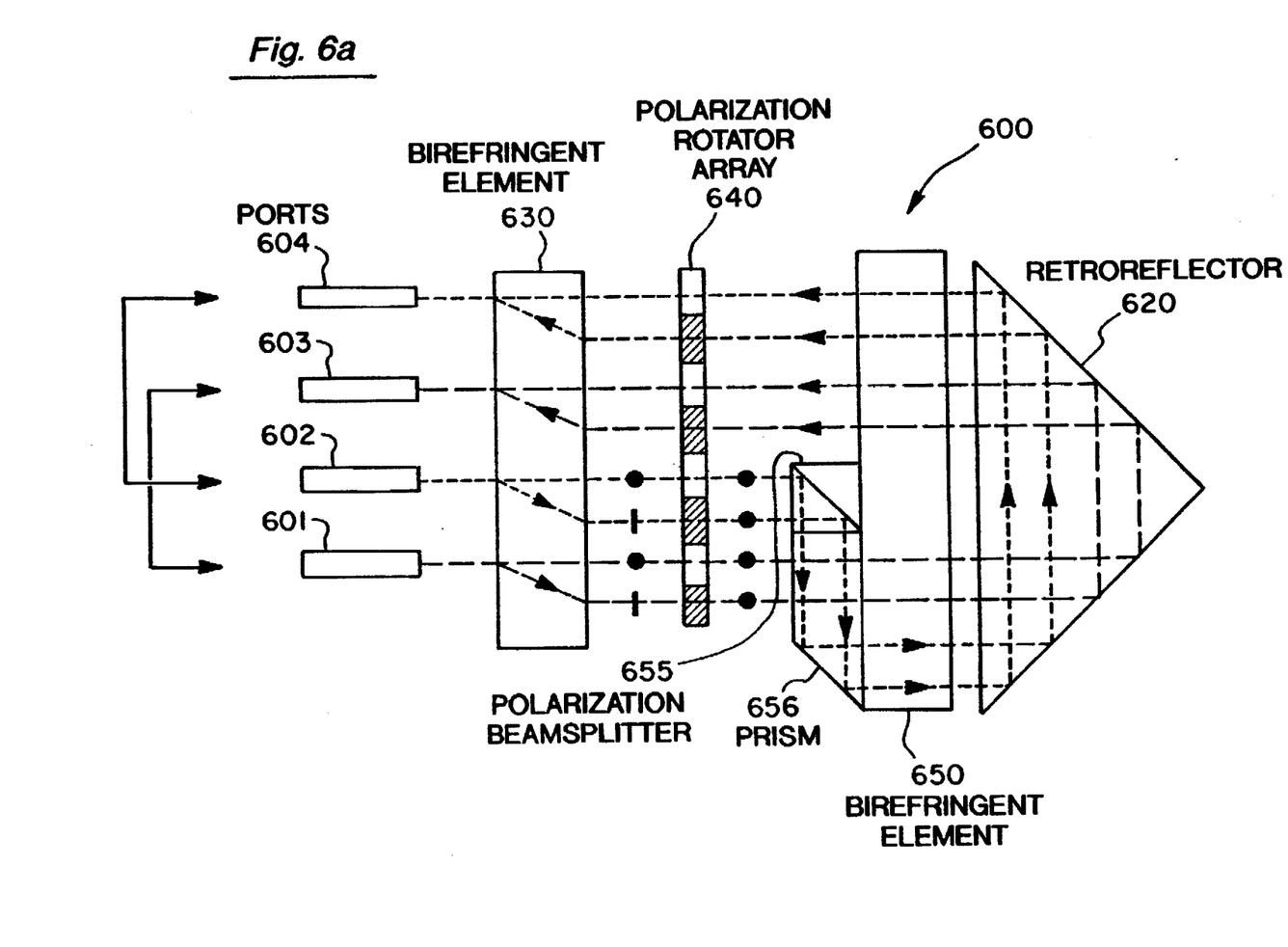
FIG. 6 illustrates a plan view of two routing states of a two-dimensionally folded implementation of a DPDT optical switch.
Figure 6B:
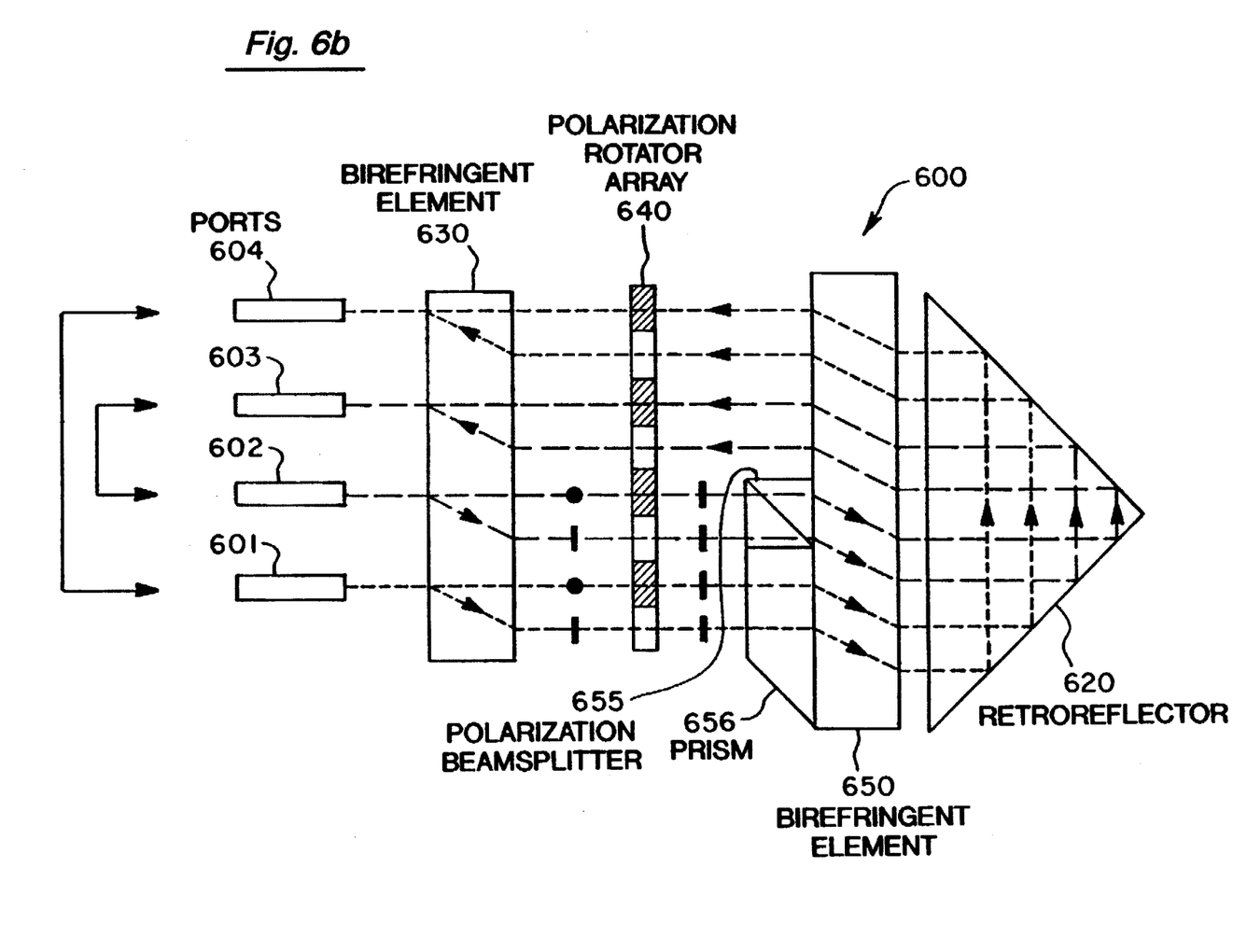

FIG. 6a and FIG. 6b show a folded DPDT switch where a polarization beam splitter 655 and a prism 656 are added to the structure shown in FIG. 5a and 5b between polarization rotator 640 and birefringent element 650 in FIG. 4. Rotator 640 comprises eight sub-elements configured to have complementary states (i.e., adjacent sub-elements have opposite on/off states). In FIG. 6a, after the light beams first pass through rotator 640 they are vertically polarized. The two light waves from port 602 are deflected by polarization beam splitter 655 and prism 656 to travel at the lower edge side of switch 600 as shown in FIG. 6a. Because the four beams are ordinary waves in birefringent element 650, they pass straight through without spatial deviation. A retroreflector such as right angle prism 620 folds the light beams and returns them to birefringent element 650. In the backward propagation path, the beams pass through birefringent element 650 again without deviation. The four beams travel through rotator 640 a second time through elements having a complementary state to that encountered during the first pass through rotator 640 such that the polarizations become orthogonal to their states when entering rotator 640 the first time. The signal portions from port 601 and 602 are recombined by birefringent element 630 to exit to ports 603 and 604 respectively as indicated by the double headed arrows adjacent ports 601–604 in FIG. 6a.

In FIG. 6b, polarization rotator 640 is switched to the complementary states such that the polarizations are horizontal after the first pass through rotator 640. The four light beams pass through beam splitter 655 and prism 656 and enter birefringent element 650 where they are displaced because of their horizontal polarization. After being folded by right angle prism reflector 620, the light beams are returned to birefringent element 650 where they are again spatially displaced. Rotator 640 is configured to set the polarization states orthogonal to that which existed before entering rotator 640 in the forward propagation path. Birefringent element 630 then combines the signals from port 601 into a single beam aligned with port 604 and the beams from port 602 into a single beam aligned with port 603.

6. Scaleable Architecture

Figure 7:
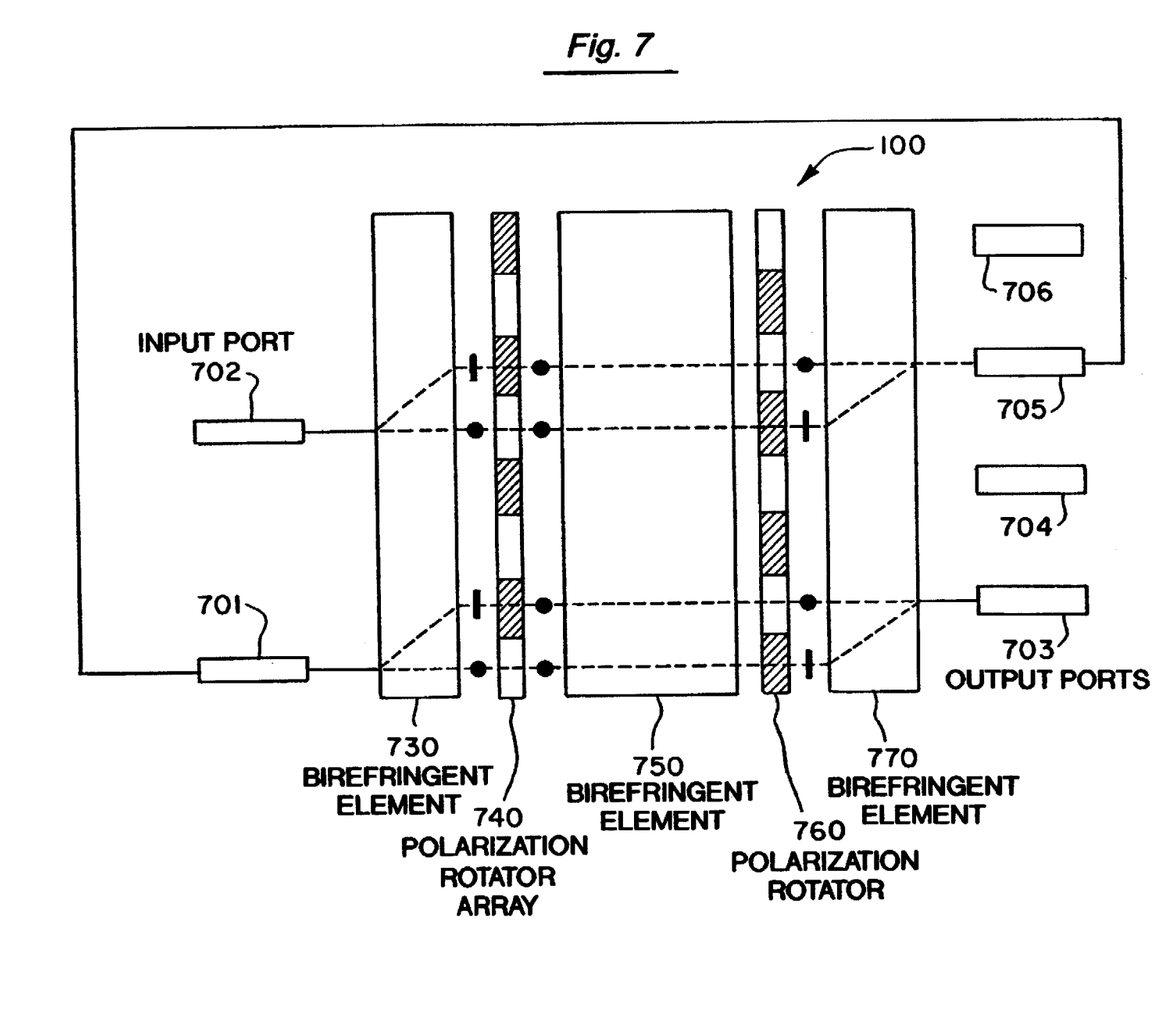
FIG. 7 shows a 1×3 optical switch using a cascaded 1×2 structure.

Switches 100, 200, 300, 400, 500 and 600 described hereinbefore are easily scaled to provide any number of input and output ports. FIG. 7 illustrates this concept by combining two SPDT switches 100 in an integrated structure to provide a 1×3 switch 700. Switch 700 uses the same number of element as switch 100 although the number of sub-elements in each of polarization converters 740 and 760 is increased to accommodate the larger number of light beams. An optical signal is input from port 702 and exits at either ports 705 or 706 depending on the state of rotators 740 and 760. Port 705 is further connected to 701 such that optical signal can be further routed to port 703 or 704. In a preferred embodiment, polarization rotators 740 and 760 comprise liquid crystal polarization rotators. Liquid crystal technology offers the advantage that rotators 740 and 760 can be patterned into segments using well-known photolithographic techniques. A single substrate can be patterned into may sub-elements and multiple switches can be provided with the same number of elements at the basis SPDT or DPDT described in this invention.

7. Conclusion

In each of the embodiments of the present invention described above, low crosstalk operation is achieved because each optical signal is broken into two orthogonally polarized portions and each of these portions passes through a polarization rotator at least two times where the state of the rotator is complementary during each pass. Prior designs used either a single polarization rotator or did not use a complementary arrangement such that each signal portion was required to be rotated at least once as it traveled through the switch.

As a result of the double pass architecture of the present invention, inter-channel crosstalk can be shown to be dominated by the product of the polarization extinction ratios of each of the at least two rotators. Hence, the device in accordance with the present invention achieves ultra-high extinction operation when either the polarization extinction ratio in the ON or OFF state of the rotator remains high. Hence, although polarization rotators may exhibit one state (either on or off) that has a poor extinction ratio, a high extinction ratio for the switch in accordance with the present invention is still achieved where the opposite state (either off or on) has a high extinction ratio.

Examples of materials suitable for construction of the birefringent elements used in the preferred embodiments include calcite, futile, lithium niobate, YVO$_4$ based crystals, and the like. Commercially available rotators having liquid crystal based technology are preferred, although other rotator technologies may be applied to meet the needs of a particular application so long as one state of the rotator has a high extinction ratio.

It is to be expressly understood that the claimed invention is not to be limited to the description of the preferred embodiment but encompasses other modifications and alterations, including the equivalent structures and materials set forth herein, within the scope and spirit of the inventive concept.

I claim:

1. A method for switching optical signals between either of two control states comprising the steps of:

providing an first input/output (I/O) port;

providing a second I/O port;

providing a third I/O port;

providing a fourth I/O port;

spatially decomposing an optical signal received from the first I/O port into two portions having orthogonal polarizations with respect to each other;

spatially decomposing an optical signal received from the fourth I/O port into third and fourth portions having orthogonal polarizations with respect to each other;

rotating the polarization of one of said first and second portions to match the polarization of the other of said first and second portions determined by the control state;

rotating the polarization of one of said third and fourth portions to match the polarization of the other of said third and fourth portions determined by the control state;

spatially routing the first and second portions based upon their polarization;

spatially routing the third and fourth portions based upon their polarization, wherein the polarization of the first, second, third, and fourth portions is the same before the steps of spatially routing;

rotating the polarization of one of said first and second portions to be orthogonal to the polarization of the other of said first and second portions;

rotating the polarization of one of said third and fourth portions to be orthogonal to the polarization of the other of said third and fourth portions;

passing the first and second portions through a birefringent element to recombine the first and second portions into a single optical signal aligned with one of the second and third I/O ports; and passing the third and fourth portions through the birefringent element to recombine the third and fourth portions into a single optical signal aligned with one of the second and third I/O ports.

2. The method of claim 1 wherein the step of spatially decomposing the optical signal received from the first I/O port comprises passing the optical signal through a birefringent element.

3. The method of claim 1 wherein the step of rotating the first portion further comprises:

passing the two portions through a configurable rotator array;

selecting the first portion from the two portions by configuring the rotator array to rotate the first portion and pass the second portion.

4. The method of claim 3 further comprising the step of applying a configuration signal to the rotator array to select the first portion.

5. The method of claim 1 further comprising reflecting the first and second portions before the step of rotating the second portion to be orthogonal to the first portion.

6. The method of claim 1 wherein the step of spatially routing the first, second, third, and fourth portions comprises:

displacing each of the first, second, third, and fourth portions based upon their polarization; and reflecting the third and fourth portions dependent upon their state after the step of displacing.

7. An optical switch comprising:

a first input/output (I/O) port;

a first birefringent element having one side coupled to the first I/O port and another side defining first and second light paths;

a first polarization rotator coupled to the other side of the first birefringent element and having a first state of two possible control states, the first rotator being aligned with the first light path;

a second polarization rotator coupled to the other side of the first birefringent element and having the second state of two possible control states, the second rotator being aligned with the second light path;

a second birefringent element having one side coupled to the first and second polarization rotators;

a third polarization rotator coupled to the other side of the second birefringent element and having the second state, the third rotator being aligned with the first light path;

a fourth polarization rotator coupled to the other side of the second birefringent element and having the first state, the fourth rotator being aligned with the second light path; and a third birefringent element having one side coupled to the third and fourth polarization rotators and another side coupled to the second I/O port.

8. The switch of claim 7 wherein the second birefringent element provides polarization dependent displacement of the first and second light paths to define third and fourth light paths when the first polarization rotator is configure to the second state and the second polarization rotator is configured in the first state, the switch further comprising:

a third I/O port coupled to the third birefringent element;

a fifth polarization rotator coupled between the second birefringent element and the third birefringent element and having the first state, the fifth rotator being aligned with the third light path; and a sixth polarization rotator coupled between the second birefringent element and the third birefringent element and having the second state, the sixth rotator being aligned with the fourth light path.

9. The switch of claim 8 wherein the first, second, third, fourth, fifth, and sixth rotators are configurable to have either the first or second state.

10. the switch of claim 9 wherein a first configuration couples the first I/O port to the second I/O port through the first and second light paths and a second configuration couples the first I/O port to the third I/O port through the third and fourth light paths.

11. The switch of claim 7 wherein the second birefringent element is rotated ninety degrees with respect to the first and third birefringent elements such that its polarization eigen plane is perpendicular to that of the first and third birefringent elements.

12. The switch of claim 7 wherein the first, second, third, and fourth polarization rotators comprise field controlled liquid crystal rotators.

13. The switch of claim 7 further comprising a retroreflector aligned to reflect and displace the first and second light path into the third birefringent element, wherein the second and third birefringent elements are formed integrally and the other side of the second birefringent element is defined by the reflected first and second light paths.

14. A double pole, double throw (DPDT) optical switch having two control states comprising:

a first input;

a second input;

a first birefringent element coupled to the first and second inputs, the birefringent element decomposing optical signals on each of the first and second inputs into a spatially distributed horizontally polarized component and a vertically polarized component;

a first polarization rotator array for converting the signal components from the first birefringent element into a single selected polarization determined by the control state;

a second birefringent element routing the optical signals dependent upon their polarization;

a beam splitter having a reflective surface positioned to reflect only one part of the optical signals emitted from the second birefringent element;

a prism positioned to receive the reflected signals from the beam splitter and further reflect the signals;

a second polarization rotator array receiving the reflected signals and the signals from the prism and the un-reflected signals from the beam splitter, the second polarization rotator arranged such that each emitted signal is orthogonally polarized with respect to its polarization upon entering the first polarization rotator array;

a third birefringent element receiving the signals from the second polarization rotator array and combining the signals into first and second output signals;

a first output port receiving the first output signal; and a second output port receiving the second output signal.

15. The switch of claim 14 wherein the second birefringent element is rotated ninety degrees with respect to the first and third birefringent elements such that its polarization eigen plane is perpendicular to that of the first and third birefringent elements.

16. The switch of claim 14 wherein the polarization selected by the first and second rotator array selectably couples either 1) the first input port to the first output port and the second input port to the second output port or 2) the first input port to the second output port and the second input port to the first output port.

17. The switch of claim 14 further comprising:

a retroreflector aligned to reflect and displace the optical signals routed by the second birefringent element into the third birefringent element, wherein the second and third birefringent elements are formed integrally.

18. The switch of claim 17 wherein the first and second rotator arrays are formed integrally.

* * * * *